(12) United States Patent
Mahadevan et al.

(10) Patent No.: US 12,384,427 B2
(45) Date of Patent: Aug. 12, 2025

(54) MANAGING DRIVER ENGAGEMENT

(71) Applicant: Arriver Software LLC, Novi, MI (US)

(72) Inventors: Shabin Mahadevan, Lake Orion, MI (US); Rachel Gray Alexander, Chicago, IL (US)

(73) Assignee: Arriver Software LLC, San Diego, CA (US)

( * ) Notice: Subject to any disclaimer, the term of this patent is extended or adjusted under 35 U.S.C. 154(b) by 318 days.

(21) Appl. No.: 18/163,100

(22) Filed: Feb. 1, 2023

(65) Prior Publication Data
US 2024/0253671 A1 Aug. 1, 2024

(51) Int. Cl.
*B60W 40/08* (2012.01)
*B60W 40/04* (2006.01)
(Continued)

(52) U.S. Cl.
CPC .... *B60W 60/0059* (2020.02); *B60W 60/0015* (2020.02); *B60W 60/0051* (2020.02);
(Continued)

(58) Field of Classification Search
CPC ............ B60W 40/08; B60W 50/0097; B60W 60/0015; B60W 60/0051; B60W 60/0057; B60W 60/0059; B60W 2040/0818; B60W 2540/21; B60W 2540/22; B60W 2540/223; B60W 2540/225; B60W 2540/229; B60W 2540/30; B60W 2556/10; B60W 40/04; B60W 50/12
See application file for complete search history.

(56) References Cited

U.S. PATENT DOCUMENTS 8,554,468 B1 * 10/2013 Bullock ............ B60W 50/0097
340/439
9,983,013 B1 * 5/2018 Krunic ............... G01C 21/3644
(Continued)

OTHER PUBLICATIONS

International Search Report and Written Opinion—PCT/US2023/081755—ISA/EPO—Apr. 24, 2024. 14 pages.
(Continued)

*Primary Examiner* — Scott A Browne
*Assistant Examiner* — Rami Nabih Bedewi
(74) *Attorney, Agent, or Firm* — Polsinelli LLP

(57) ABSTRACT

Various embodiments of methods and systems for managing driver engagement may include evaluating a driving risk on a roadway proximate to the vehicle using historical roadway data, identifying an emotive expression of the driver using vehicle sensor data, obtaining historical data about driver reaction times for assuming full control of other vehicles and whether assuming full control of the other vehicles avoided an accident on the roadway, selecting a minimum level of driver engagement suitable for the roadway proximate to the vehicle based on the evaluated driving risk, the identified emotive expression of the driver, and whether historical driver fallback behavior avoided an accident on the roadway proximate to the vehicle, observing a driver behavior using one or more vehicle sensors, and taking an action in response to determining that the driver behavior does not meet the minimum level of driver engagement suitable for the roadway proximate to the vehicle.

30 Claims, 9 Drawing Sheets

(51) Int. Cl.
 *B60W 50/12* (2012.01)
 *B60W 60/00* (2020.01)
(52) U.S. Cl.
 CPC ..... *B60W 2540/21* (2020.02); *B60W 2540/22* (2013.01); *B60W 2540/223* (2020.02); *B60W 2540/225* (2020.02); *B60W 2540/229* (2020.02); *B60W 2540/30* (2013.01); *B60W 2556/10* (2020.02)

(56) References Cited

U.S. PATENT DOCUMENTS

| | | |
|---|---|---|
| 2017/0174221 A1 | 6/2017 | Vaughn et al. |
| 2020/0122741 A1* | 4/2020 | Kuehnle ............... B60W 50/14 |
| 2020/0247420 A1 | 8/2020 | Gunaratne |
| 2021/0237645 A1* | 8/2021 | Farrell ................. B60W 50/14 |
| 2021/0245770 A1 | 8/2021 | Zhou et al. |
| 2022/0176996 A1 | 6/2022 | Park et al. |
| 2022/0185296 A1 | 6/2022 | Zheng et al. |
| 2022/0203996 A1* | 6/2022 | Katz .................... B60W 50/14 |

OTHER PUBLICATIONS

Al-Shihabi T., et al., "A Framework for Modeling Human-like Driving Behaviors for Autonomous Vehicles in Driving Simulators", Proceedings 5th International Conference on Autonomous Agents, Jun. 2001, 286-291, 7 Pages.

\* cited by examiner

MANAGING DRIVER ENGAGEMENT

BACKGROUND

Supervised automation features are rapidly being incorporated in consumer vehicles around the world. "Supervised automation features" are driving assistance functions operating, for example, at Society of Automotive Engineers (SAE) Level 2 (L2), i.e., "driver assistance." Supervised automation features can be responsible for vehicle speed, distance and lane keeping when active, while the human driver remains engaged in driving to handle scenarios that the system is not designed to address.

Real world driving situations are infinitely varied. Vehicle automation features typically possess poor anticipation skills in unforeseen scenarios, whereas anticipation and proactivity is a known strength of the human driver. Human drivers typically alter their driving behavior based on the context in which they are driving. For example, distracted human drivers, such as drivers using a mobile phone, may reduce their speed, increase their headway, or scan their environment more often. However, distracted humans are notoriously bad at multitasking in dynamic conditions such as when driving, as evidenced by the dramatic increase in distracted driving-related accidents, injuries, and fatalities in recent years.

SUMMARY

Various aspects include methods that may be performed by a processing system of a vehicle for managing driver engagement. Various aspects include evaluating a driving risk on a roadway proximate to the vehicle using historical data associated with the roadway, identifying an emotive expression of the driver using vehicle sensor data, obtaining historical data about driver reaction times for assuming full control of another vehicle, selecting a minimum level of driver engagement suitable for the roadway proximate to the vehicle based on the evaluated driving risk, the identified emotive expression of the driver, and historical data about driver reaction times, observing a driver behavior using one or more vehicle sensors; and taking an action in response to determining that the driver behavior does not meet the minimum level of driver engagement suitable for the roadway proximate to the vehicle. Some aspects may further include obtaining historical data regarding whether assuming full control of the other vehicles avoided an accident on the roadway proximate to the vehicle, in which selecting the minimum level of driver engagement suitable for the roadway proximate to the vehicle may be further based on historical data regarding whether assuming full control of the other vehicles avoided an accident on the roadway proximate to the vehicle.

In some aspects, evaluating the driving risk on the roadway proximate to the vehicle using historical data associated with the roadway may include determining a risk metric based on one or more of a metric of a frequency of one or more accidents that occurred in the roadway proximate to the vehicle, a severity metric of the one or more accidents, and a driver behavior metric of driver behavior prior to each of the one or more accidents.

In some aspects, evaluating the driving risk on the roadway proximate to the vehicle using historical data associated with the roadway may be further based on sensor data received from one or more vehicle sensors. In some aspects, identifying the emotive expression of the driver using vehicle sensor data may be based on one or more of a driver facial expression, a driver utterance, a driver hand gesture, or a driver stress level.

In some aspects, the minimum level of driver engagement suitable for the roadway proximate to the vehicle may include a duration of time that the driver is permitted to remove a hand from a steering wheel of the vehicle. In some aspects, the minimum level of driver engagement suitable for the roadway proximate to the vehicle may include a duration of time that the driver is permitted to avert eyes from the roadway. In some aspects, taking the action in response to determining that the driver behavior does not meet the minimum level of driver engagement suitable for the roadway proximate to the vehicle may include disabling driver access to one or more functions of the vehicle in response to determining that the driver behavior does not meet the minimum level of driver engagement.

Further aspects include a processing system of a vehicle including a memory and a processor configured to perform operations of any of the methods summarized above. Further aspects may include a processing system of a vehicle having various means for performing functions corresponding to any of the methods summarized above. Further aspects may include a non-transitory processor-readable storage medium having stored thereon processor-executable instructions configured to cause a processing system of a vehicle to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
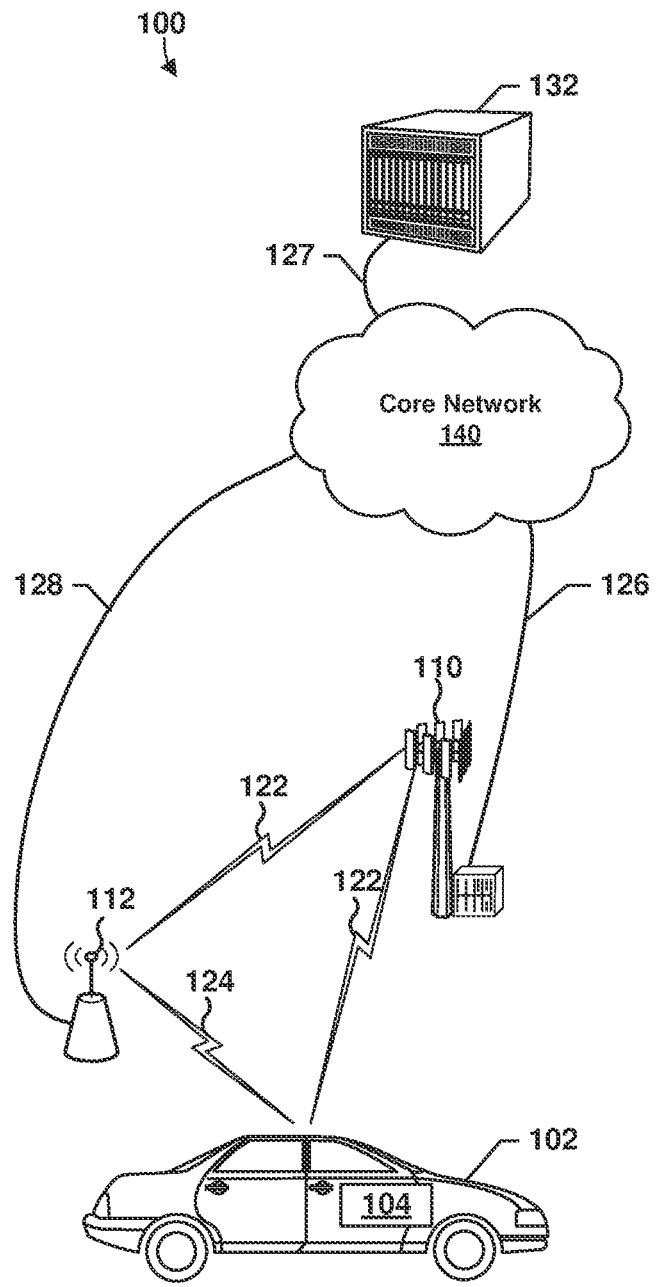
FIG. 1A is a system block diagram illustrating an example communication system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and vehicle processing systems configured to perform the methods of managing driver engagement. In various embodiments, a vehicle processing system may include one or more processors and/or other components configured to perform various operations for managing driver engagement. In various embodiments, a vehicle processing system may evaluate a driving risk on a roadway proximate to the vehicle using historical data associated with the roadway, identify an emotive expression of the driver using vehicle sensor data, and obtain historical data (e.g., from a fleet or crowd-source database) about driver fallback behavior, which may including driver reaction times for assuming full control of other vehicles and/or whether assuming full control of the other vehicles avoided an accident on the roadway proximate to the vehicle under comparable conditions and/or circumstances. Based on the evaluated driving risk, the identified emotive expression of the driver, and whether historical driver fallback behavior avoided an accident on the roadway proximate to the vehicle, the vehicle processing system may select a minimum level of driver engagement suitable for the roadway proximate to the vehicle. The vehicle processing system may observe behavior of the driver (a "driver behavior") using one or more vehicle sensors, and may take an action in response to determining that the driver behavior does not meet the minimum level of driver engagement suitable for the roadway proximate to the vehicle. In this manner, the vehicle processing system may relate driver engagement and the driving context, and the driving context to driver engagement, and may perform operations to encourage or promote driver engagement.

As used herein, the term "vehicle" refers generally to any of an automobile, motorcycle, truck, bus, boat, and any other type of vehicle that may be configured with a processing system for managing driver engagement.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Driver engagement refers to the degree to which a driver is actively involved in operating a vehicle. For example, if a driver is not paying attention to the road or is distracted, the driver may not be able to respond appropriately to road conditions, traffic conditions, or warnings or alerts from vehicle safety systems. If a driver is fully engaged and paying attention to the road, the driver is more likely to respond quickly and effectively to such notifications or conditions.

Real world driving situations are infinitely varied. Vehicle automation features typically possess poor anticipation skills in unforeseen scenarios, whereas anticipation and proactivity is a known strength of the human driver. Human drivers typically alter their driving behavior based on the context in which they are driving (referred to as "risk homeostasis"). For example, drivers using a mobile phone may reduce their speed, increase their distance from other vehicles, or scan their environment more often to compensate for the increased risk caused by mobile phone use. However, humans are notoriously inconsistent in the manner in which they apply such mitigation strategies. Further, the fact remains that distracted drivers are dangerous drivers that increasingly cause accidents and injuries. Indeed, distracted driving has become the leading cause of road accidents in the United States.

Various embodiments provide methods implemented in vehicle processing systems for managing driver engagement to improve vehicle operation and safety by dynamically evaluating a driver's engagement and the driving context, and determining a level of driver engagement suitable for the driving context. The vehicle processing system may take an action to encourage or improve driver engagement that does not meet the determined level driver engagement suitable for the driving context. In some embodiments, a vehicle processing system may evaluate a driving risk on a roadway proximate to the vehicle using historical data associated with the roadway, identify an emotive expression of the driver using vehicle sensor data, and obtain historical data about driver fallback behavior including driver reaction times for assuming full control of other vehicles. In some embodiments the vehicle processing system may also obtain historical data regarding whether drivers assuming full control of the other vehicles avoided an accident on the roadway proximate to the vehicle at the same location and/or under comparable conditions and/or circumstances. Based on the evaluated driving risk, the identified emotive expression of the driver, and whether historical driver fallback behavior avoided an accident on the roadway proximate to the vehicle, the vehicle processing system may select a minimum level of driver engagement suitable for the roadway proximate to the vehicle. The vehicle processing system may observe driver behavior using one or more vehicle sensors, and may take an action in response to determining that the driver behavior does not meet the minimum level of driver engagement suitable for the roadway proximate to the vehicle.

In some embodiments, the vehicle processing system may evaluate the driving risk on the roadway proximate to the vehicle based on a risk metric. In some embodiments, the vehicle processing system may determine the risk metric based on one or more of a metric of a frequency of one or more accidents that occurred in the roadway proximate to the vehicle, a severity metric of the one or more accidents, and a driver behavior metric of driver behavior prior to each of the one or more accidents. For example, the vehicle processing system may determine whether accidents are common, frequent, infrequent, uncommon, on the roadway near, around, in front of, or otherwise proximate to the vehicle. The vehicle processing system may quantify the frequency of one or more accidents with a metric, a value, a quantity, or another suitable quantification. The vehicle processing system may determine a severity metric for each accident, such as a value or quantity indicating a severity of each accident. In some embodiments, the severity metric may indicate a measure or degree of severity of the accident.

The vehicle processing system may determine a metric, value, quantity, or other suitable quantification of driver behavior prior to each of the accidents. In some embodiments, the driver behavior metric may indicate one or more behaviors, such as whether the driver was driving attentively, was distracted, was paying attention to road, was interacting with a vehicle infotainment system, was using a cell phone, or another behavior. In some embodiments, the driver behavior metric also may include an indication of a severity of driver distraction, or a duration of time that a driver was distracted or otherwise not driving attentively.

In some embodiments, the vehicle processing system may evaluate the driving risk on the roadway proximate to the vehicle based on sensor data received from one or more vehicle sensors. For example, the sensor data may indicate a traffic condition (e.g., congestion, bumper-to-bumper traffic, fast-moving traffic, or any other suitable traffic condition), or a road condition (e.g., wet roads, narrow lanes, unclear lane markings, or any other suitable road condition).

In some embodiments, the vehicle processing system may identify an emotive expression of the driver based on one or more of a driver facial expression, a driver utterance, a driver hand gesture, or a driver stress level. For example, the vehicle processing system may include a facial expression recognition system, which may use cameras and computer vision algorithms to analyze the driver's facial expressions and potentially identify emotions such as happiness, anger, or frustration. As another example, the vehicle processing system may include voice analysis system, which may use a microphone and natural language processing algorithms to analyze the driver's voice and/or identify a driver's emotions based on factors such as pitch, volume, and rate of speech. As another example, the vehicle processing system may include physiological sensors, such as biometric sensors embedded in the steering wheel, which may measure physiological parameters such as heart rate or galvanic skin response to measure the driver's physiological responses, which can may provide information indicative of the driver's emotional state. As another example, the vehicle processing system may include a gaze tracking system that may use cameras and computer vision algorithms to track the driver's gaze and in further driver's emotional state based on factors such as orientation of the driver's eyes and a duration of eye orientation, indicating where and for how long the driver is looking.

In some embodiments, the minimum level of driver engagement suitable for the roadway proximate to the vehicle that is selected by the vehicle processing system may include one or more parameters that are measurable using sensors of the vehicle. For example, the minimum level of driver engagement may include a duration of time (e.g., a duration of seconds) that the driver is permitted to remove a hand from a steering wheel of the vehicle. As another example, the minimum level of driver engagement may include a duration of time (e.g., a duration of seconds) that the driver is permitted to avert their eyes from the roadway.

In response to determining that the driver behavior does not meet the minimum level of driver engagement suitable for the roadway proximate to the vehicle, the vehicle processing system may take an action, such as to encourage driver engagement, and/or to mitigate or reduce driver distractions. In some embodiments, the vehicle processing system may disable driver access to one or more functions of the vehicle in response to determining that the driver behavior does not meet the minimum level of driver engagement. For example, the vehicle processing system may disable driver access to one or more functions of a vehicle infotainment system, a vehicle communication system, or another vehicle system having a display or involving interaction that is tangentially related, not directly related, or unrelated to driving the vehicle.

Various embodiments improve the safety and operation of vehicles by enabling vehicle processing systems to dynamically evaluate driver attentiveness or driver engagement in relation to the driving environment or context. Various embodiments improve the safety and operation of vehicles by enabling vehicle processing systems to take actions to encourage driver engagement or attentiveness, and/or to reduce driver distraction.

FIG. 1A is a system block diagram illustrating an example communication system 100 suitable for implementing the various embodiments. The communications system 100 include a 5G New Radio (NR) network, an Intelligent Transportation System (ITS) V2X wireless network, and/or any other suitable network such as a Long Term Evolution (LTE) network. References to a 5G network and 5G network elements in the following descriptions are for illustrative purposes and are not intended to be limiting.

The communications system 100 may include a heterogeneous network architecture that includes a core network 140, a number of base stations 110, and a variety of mobile devices including a vehicle 102 equipped with a vehicle processing system 104 that includes wireless communication capabilities. The base station 110 may communicate with a core network 140 over a wired communication link 126. The communications system 100 also may include roadside units 112 supporting V2X communications with vehicles 102 via V2X wireless communication links 124.

A base station 110 is a network element that communicates with wireless devices (e.g., a vehicle processing system 104 of the vehicle 102) via a wireless communication link 122, and may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station 110 may provide communication coverage for a particular geographic area or "cell." In 3GPP, the term "cell" can refers to a coverage area of a base station, a base station subsystem serving this coverage area, or a combination thereof, depending on the context in which the term is used. The core network 140 may be any type of core network, such as an LTE core network (e.g., an evolved packet core (EPC) network), 5G core network, a disaggregated network as described with reference to FIG. 1B, etc.

Roadside units 112 may communicate with the core network 140 via a wired or wireless communication link 128. Roadside units 112 may communicate via V2X wireless communication links 124 with vehicle processing system-equipped vehicles 102 for downloading information useful for vehicle processing system autonomous and semi-autonomous driving functions, and for receiving information such as misbehavior reports from the vehicle processing system 104.

A Misbehavior Authority network computing device (MA) 132 may communicate with the core network 140 via a wired or wireless communication link 127. The MA 132 may receive misbehavior reports from the vehicle processing system 104 as may be sent by the vehicle processing system 104 from time to time.

Wireless communication links 122 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Figure 1B:
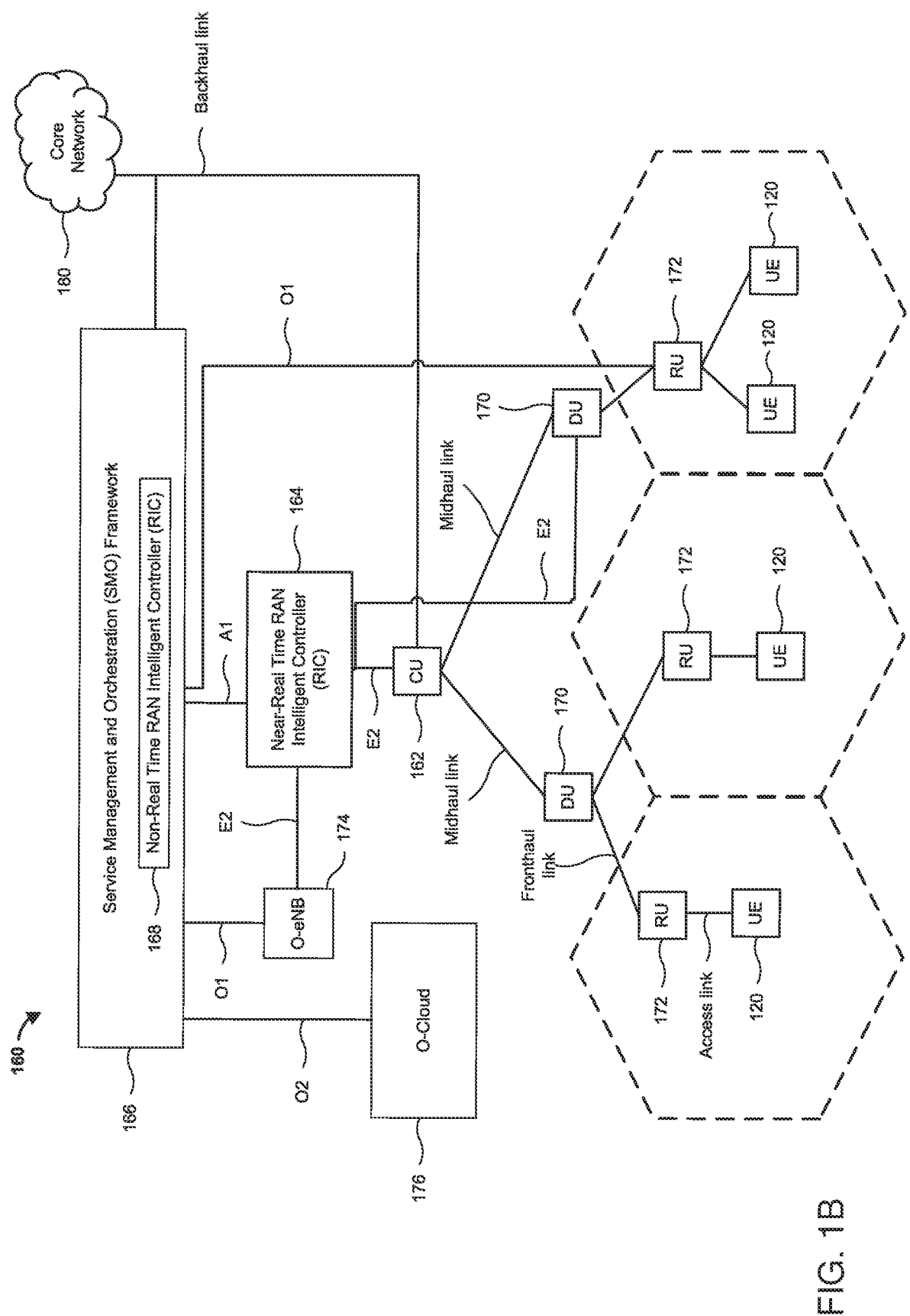
FIG. 1B is a system block diagram illustrating an example disaggregated base station architecture suitable for implementing various embodiments.

FIG. 1B is a system block diagram illustrating an example disaggregated base station 160 architecture that may be part of a V2X and/or 5G network suitable for communicating map data to vehicles and communicating updated object/feature location data according to any of the various embodiments. With reference to FIGS. 1A and 1B, the disaggregated base station 160 architecture may include one or more central units (CUs) 162 that can communicate directly with a core network 180 via a backhaul link, or indirectly with the core network 180 through one or more disaggregated base station units, such as a Near-Real Time (Near-RT) RAN Intelligent Controller (RIC) 164 via an E2 link, or a Non-Real Time (Non-RT) RIC 168 associated with a Service Management and Orchestration (SMO) Framework 166, or both. A CU 162 may communicate with one or more distributed units (DUs) 170 via respective midhaul links, such as an F1 interface. The DUs 170 may communicate with one or more radio units (RUS) 172 via respective fronthaul links. The RUs 172 may communicate with respective UEs 120 via one or more radio frequency (RF) access links. In some implementations, user equipment (UE), such as a vehicle processing system 104, may be simultaneously served by multiple RUs 172.

Each of the units (i.e., CUs 162, DUs 170, RUs 172), as well as the Near-RT RICs 164, the Non-RT RICs 168 and the SMO Framework 166, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 162 may host one or more higher layer control functions. Such control functions may include the radio resource control (RRC), packet data convergence protocol (PDCP), service data adaptation protocol (SDAP), or the like. Each control function may be implemented with an interface configured to communicate signals with other control functions hosted by the CU 162. The CU 162 may be configured to handle user plane functionality (i.e., Central Unit-User Plane (CU-UP)), control plane functionality (i.e., Central Unit-Control Plane (CU-CP)), or a combination thereof. In some implementations, the CU 162 can be logically split into one or more CU-UP units and one or more CU-CP units. The CU-UP unit can communicate bidirectionally with the CU-CP unit via an interface, such as the E1 interface when implemented in an O-RAN configuration. The CU 162 can be implemented to communicate with DUs 170, as necessary, for network control and signaling.

The DU 170 may correspond to a logical unit that includes one or more base station functions to control the operation of one or more RUs 172. In some aspects, the DU 170 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 170 may further host one or more low PHY layers. Each layer (or module) may be implemented with an interface configured to communicate signals with other layers (and modules) hosted by the DU 170, or with the control functions hosted by the CU 162.

Lower-layer functionality may be implemented by one or more RUs 172. In some deployments, an RU 172, controlled by a DU 170, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 172 may be implemented to handle over the air (OTA) communication with one or more UEs 120. In some implementations, real-time and non-real-time aspects of control and user plane communication with the RU(s) 172 may be controlled by the corresponding DU 170. In some scenarios, this configuration may enable the DU(s) 170 and the CU 162 to be implemented in a cloud-based radio access network (RAN) architecture, such as a vRAN architecture.

The SMO Framework 166 may be configured to support RAN deployment and provisioning of non-virtualized and virtualized network elements. For non-virtualized network elements, the SMO Framework 166 may be configured to support the deployment of dedicated physical resources for RAN coverage requirements, which may be managed via an operations and maintenance interface (such as an O1 interface). For virtualized network elements, the SMO Framework 166 may be configured to interact with a cloud computing platform (such as an open cloud (O-Cloud) 176) to perform network element life cycle management (such as to instantiate virtualized network elements) via a cloud computing platform interface (such as an O2 interface). Such virtualized network elements can include, but are not limited to, CUs 162, DUs 170, RUs 172 and Near-RT RICs 164. In some implementations, the SMO Framework 166 may communicate with a hardware aspect of a 4G RAN, such as an open eNB (O-eNB) 174, via an O1 interface. Additionally, in some implementations, the SMO Framework 166 may communicate directly with one or more RUs 172 via an O1 interface. The SMO Framework 166 also may include a Non-RT RIC 168 configured to support functionality of the SMO Framework 166.

The Non-RT RIC 168 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 164. The Non-RT RIC 168 may be coupled to or communicate with (such as via an A1 interface) the Near-RT RIC 164. The Near-RT RIC 164 may be configured to include a logical function that enables near-real-time control and optimization of RAN elements and resources via data collection and actions over an interface (such as via an E2 interface) connecting one or more CUs 162, one or more DUs 170, or both, as well as an O-eNB, with the Near-RT RIC 164.

In some implementations, to generate AI/ML models to be deployed in the Near-RT RIC 164, the Non-RT RIC 168 may receive parameters or external enrichment information from external servers. Such information may be utilized by the Near-RT RIC 164 and may be received at the SMO Framework 166 or the Non-RT RIC 168 from non-network data sources or from network functions. In some examples, the Non-RT RIC 168 or the Near-RT RIC 164 may be configured to tune RAN behavior or performance. For example, the Non-RT RIC 168 may monitor long-term trends and patterns for performance and employ AI/ML models to perform corrective actions through the SMO Framework 166 (such as reconfiguration via O1) or via creation of RAN management policies (such as A1 policies).

Figure 2A:
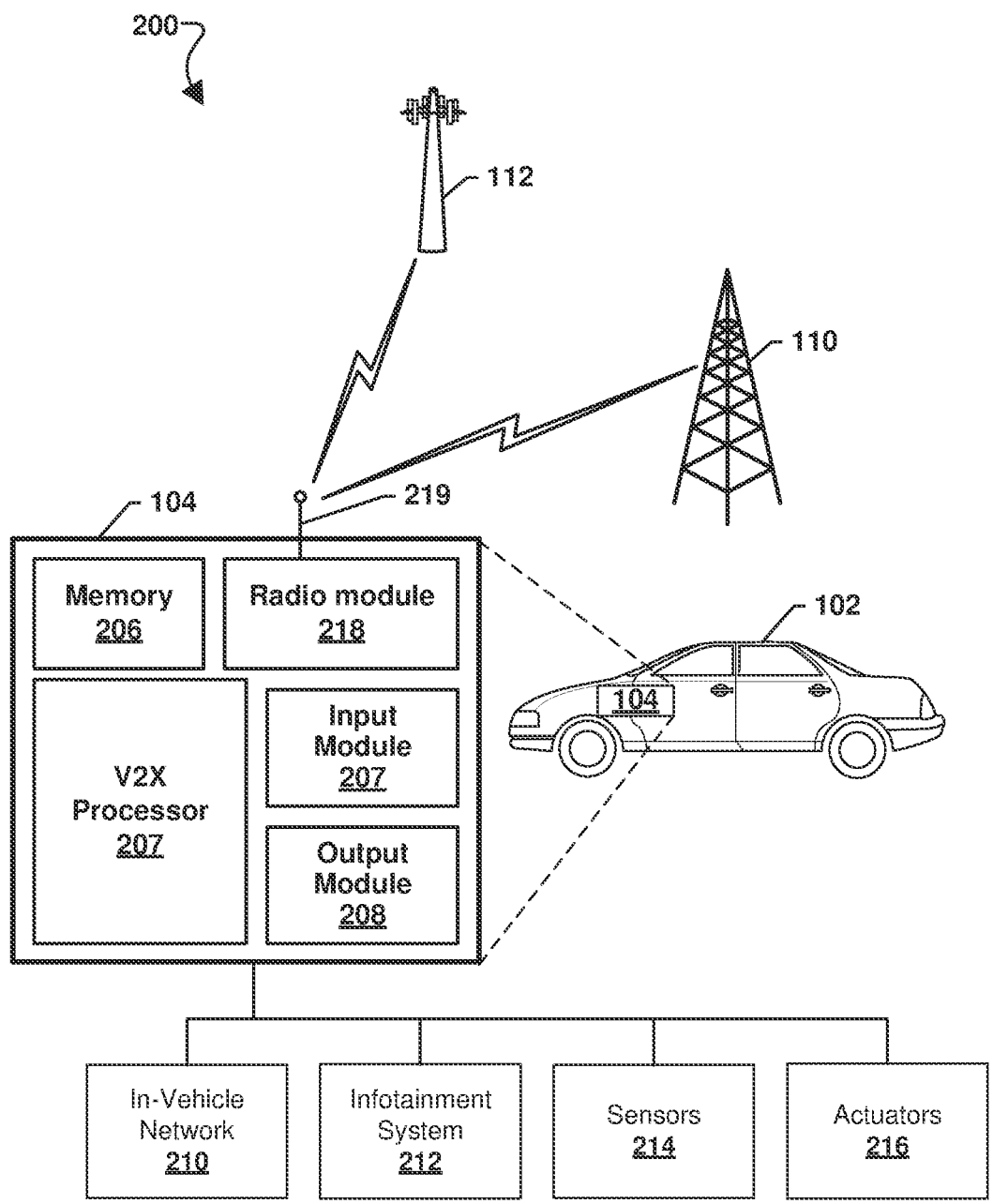
FIG. 2A is a component diagram of an example vehicle processing system suitable for implementing various embodiments.

FIG. 2A is a component diagram of an example vehicle processing system 200 including a suitable for implementing various embodiments. With reference to FIGS. 1A-2A, the processing system 200 may include a vehicle 102 that includes a vehicle processing system 104. The vehicle processing system 104 may communicate with various systems and devices, such as an in-vehicle network 210, an infotainment system 212, various sensors 214, various actuators 216, and a radio module 218 coupled to an antenna 219. The vehicle processing system 104 also may communicate with roadside units 112, cellular communication network base stations 110, and other external devices.

The vehicle processing system 104 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The vehicle processing system 104 may include a V2X antenna 219 coupled to the radio module 218 that is configured to communicate with one or more ITS participants (e.g., stations), a roadside unit 112, and a base station 110 or another suitable network access point. The V2X antenna 219 and radio module 218 may be configured to receive dynamic traffic flow feature information via vehicle-to-everything (V2X) communications. In various embodiments, the vehicle processing system may receive information from a plurality of information sources, such as the in-vehicle network 210, infotainment system 212, various sensors 214, various actuators 216, and the radio module 218. The vehicle processing system may be configured to perform autonomous or semi-autonomous driving functions using map data in addition to sensor data, as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 2B:
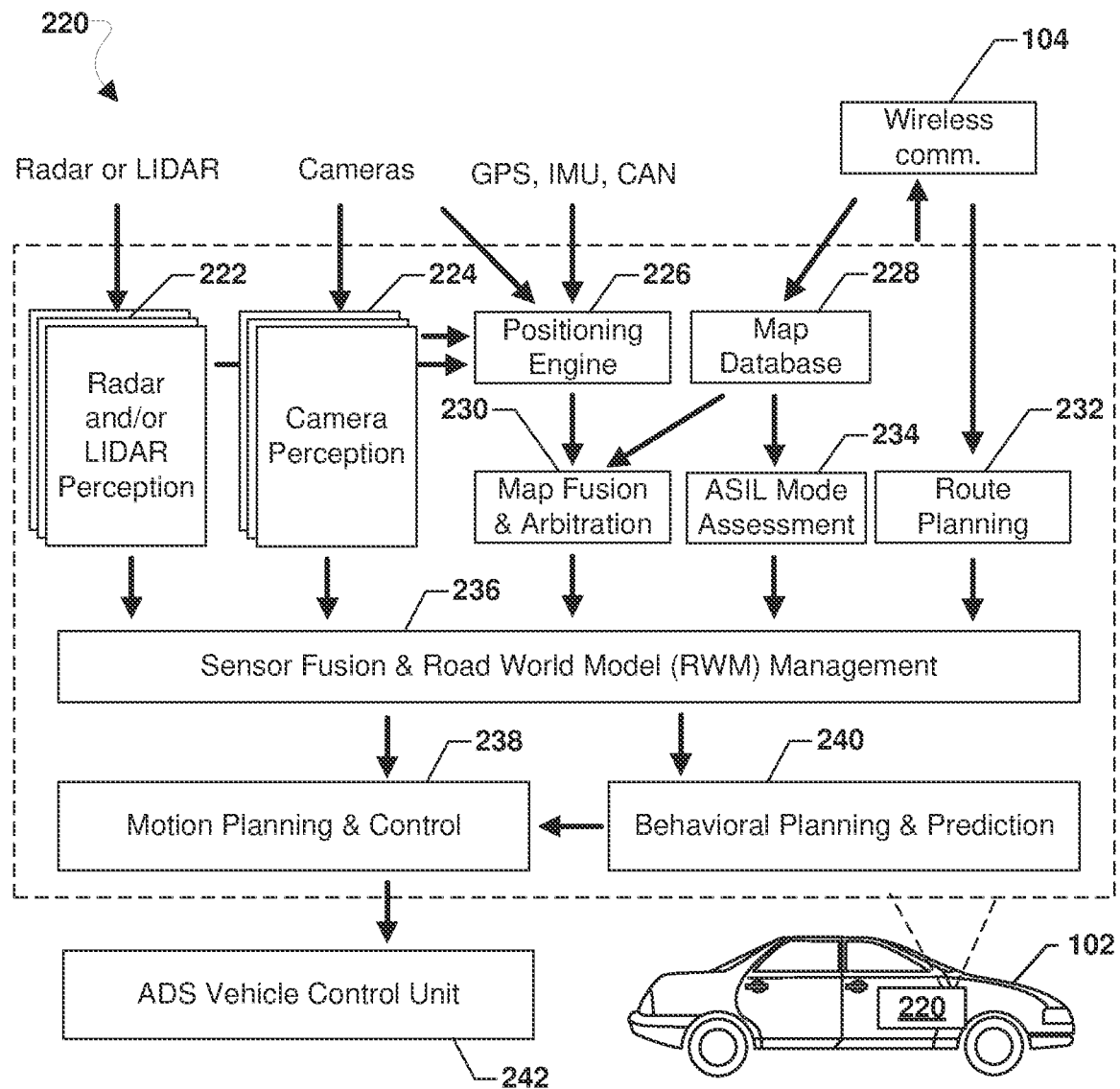
FIG. 2B is a component block diagram illustrating components of an example vehicle processing system suitable for implementing various embodiments.

FIG. 2B is a component block diagram illustrating components of an example vehicle processing system 220 suitable for implementing various embodiments. With reference to FIGS. 1A-2A, the vehicle processing system 220, which may include an autonomous or semiautonomous driving system, may be coupled to the vehicle processing system 104. The vehicle processing system 220 may include various subsystems, communication elements, computational elements, computing devices or units which may be utilized within a vehicle 102. The various computational elements, computing devices or units within the vehicle processing system 220 may be implemented within a system of computing devices (i.e., subsystems) that communicate data and commands to each other via the in-vehicle network 210 (e.g., indicated by the arrows in FIG. 2B). In some implementations, the various computational elements, computing devices or units within the vehicle processing system 220 may be implemented within a single computing device, such as separate threads, processes, algorithms or computational elements. Therefore, each subsystem/computational element illustrated in FIG. 2B is also generally referred to herein as a "layer" within a computational "stack" that constitutes the vehicle processing system 220. However, the use of the terms layer and stack in describing various embodiments are not intended to imply or require that the corresponding functionality is implemented within a single vehicle computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle processing system 220 may include a radar and/or lidar perception layer 222, a camera perception layer 224, a positioning engine layer 226, a map database 228, a map fusion and arbitration layer 230, a route planning layer 232, an operating mode assessment layer 234, a sensor fusion and road world model (RWM) management layer 236, a motion planning and control layer 238, and a behavioral planning and prediction layer 240. The layers 222-240 are merely examples of some layers in one example configuration of the vehicle processing system 220. In other configurations, other layers may be included, such as additional layers for other perception sensors (e.g., a lidar perception layer, etc.), additional layers for planning and/or control, additional layers for modeling, etc., and/or certain of the layers 222-240 may be excluded from the vehicle processing system 220. Each of the layers 222-240 may exchange data, computational results and commands as illustrated by the arrows in FIG. 2B.

Further, the vehicle processing system 220 may receive and process data from sensors (e.g., radar, lidar, cameras, inertial measurement units (IMU) etc.), navigation information sources (e.g., Global Positioning System (GPS) receivers, IMUs, etc.), vehicle networks (e.g., Controller Area Network (CAN) bus), and databases in memory (e.g., digital map data).

The vehicle processing system 220 may output vehicle control commands or signals to an autonomous driving system (ADS) vehicle control unit 242, which is a system, subsystem or computing device that interfaces directly with vehicle steering, throttle and brake controls. The configuration of the vehicle processing system 220 and ADS vehicle control unit 242 illustrated in FIG. 2A is merely an example configuration and other configurations of a vehicle management system and other vehicle components may be used. As an example, the configuration of the vehicle processing system 220 and ADS vehicle control unit 242 illustrated in FIG. 2B may be used in a vehicle configured for autonomous or semi-autonomous operation while a different configuration may be used in a non-autonomous vehicle.

The radar and/or lidar perception layer 222 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 222 may include use of neural network processing and artificial intelligence methods to recognize objects and vehicles, and pass such information on to the sensor fusion and RWM management layer 236.

The camera perception layer 224 may receive data from one or more cameras, such as cameras, and process the data to recognize and determine locations of other vehicles and objects within a vicinity of the vehicle 100. The camera perception layer 224 may include use of neural network processing and artificial intelligence methods to recognize objects and vehicles, and pass such information on to the sensor fusion and RWM management layer 236.

The positioning engine layer 226 may receive data from the radar and/or lidar perception layer 222, the camera perception layer 224, and various sources of navigation information, and process the data and information to determine a position of the vehicle 100. Various sources of navigation information may include, but is not limited to, a GPS receiver, an IMU, and/or other sources and sensors connected via a CAN bus. The positioning engine layer 226 may also utilize inputs from one or more cameras, such as cameras and/or any other available sensor capable of identifying and determining directions and distances to objects in the vicinity of the vehicle, such as radars, lidars, etc.

The vehicle processing system 220 may include or be coupled to a vehicle processing system 104 according to various embodiments. One or more of the layers 222-240 may provide information to or receive information from the vehicle processing system 104. The vehicle processing system 104 may be configured to communicate with highway communication systems, such as via V2X communication links (e.g., 124) and/or to remote information sources (e.g., computing device 132) via cellular wireless communication links (e.g., 122), such as via 5G cellular networks.

The map fusion and arbitration layer 230 may access the map database 228 for location information regarding nearby objects and features, and receive localizing/navigation information output from the positioning engine layer 226, and process the data to further determine the position of the vehicle 102 within the map, such as location within a lane of traffic, position within a street map, etc. sensor data may be stored in a memory (e.g., memory 312).

Similar to location information in some map objects and features and sensor accuracy and precision, GPS position fixes include some error, so the map fusion and arbitration layer 230 may function to determine a best guess location of the vehicle within a roadway based upon an arbitration between the GPS coordinates, sensor data, and map data regarding objects and features in and near the roadway. For example, while GPS coordinates may place the vehicle near the middle of a two-lane road in the sensor data, the map fusion and arbitration layer 230 may determine from the direction of travel that the vehicle is most likely aligned with the travel lane consistent with the direction of travel. The map fusion and arbitration layer 230 may pass arbitrated map location information to the sensor fusion and RWM management layer 236.

The route planning layer 232 may utilize sensor data, as well as inputs from an operator or dispatcher to plan a route to be followed by the vehicle 102 to a particular destination. The route planning layer 232 may pass map-based location information to the sensor fusion and RWM management layer 236. However, the use of a prior map by other layers, such as the sensor fusion and RWM management layer 236, etc., is not required. For example, other stacks may operate and/or control the vehicle based on perceptual data alone without a provided map, constructing lanes, boundaries, and the notion of a local map as perceptual data is received.

In embodiments including an operating mode assessment layer 234, that processing layer may use safety and/or confidence information regarding nearby objects and features to select an appropriate ADS driving mode. In some embodiments, the operating mode assessment layer 234 may determine whether the current autonomous or semi-autonomous driving mode is consistent with or appropriate in view of safety and/or confidence information regarding nearby objects and features in the driving environment.

The sensor fusion and RWM management layer 236 may receive data and outputs produced by the radar and/or lidar perception layer 222, camera perception layer 224, map fusion and arbitration layer 230, route planning layer 232, and the operating mode assessment layer 234, and use some or all of such inputs to estimate or refine the location and state of the vehicle 102 in relation to the road, other vehicles on the road, and other objects within a vicinity of the vehicle 100. For example, the sensor fusion and RWM management layer 236 may combine imagery data from the camera perception layer 224 with arbitrated map location information from the map fusion and arbitration layer 230 to refine the determined position of the vehicle within a lane of traffic. As another example, the sensor fusion and RWM management layer 236 may combine object recognition and imagery data from the camera perception layer 224 with object detection and ranging data from the radar and/or lidar perception layer 222 to determine and refine the relative position of other vehicles and objects in the vicinity of the vehicle. As another example, the sensor fusion and RWM management layer 236 may receive information from V2X communications (such as via the CAN bus) regarding other vehicle positions and directions of travel, and combine that information with information from the radar and/or lidar perception layer 222 and the camera perception layer 224 to refine the locations and motions of other vehicles. The sensor fusion and RWM management layer 236 may output refined location and state information of the vehicle 100, as well as refined location and state information of other vehicles and objects in the vicinity of the vehicle, to the motion planning and control layer 238 and/or the behavior planning and prediction layer 240.

As a further example, the sensor fusion and RWM management layer 236 may use dynamic traffic control instructions directing the vehicle 102 to change speed, lane, direction of travel, or other navigational element(s), and combine that information with other received information to determine refined location and state information. The sensor fusion and RWM management layer 236 may output the refined location and state information of the vehicle 102, as well as refined location and state information of other vehicles and objects in the vicinity of the vehicle 100, to the motion planning and control layer 238, the behavior planning and prediction layer 240 and/or devices remote from the vehicle 102, such as a data server, other vehicles, etc., via wireless communications, such as through C-V2X connections, other wireless connections, etc.

As a still further example, the sensor fusion and RWM management layer 236 may monitor perception data from various sensors, such as perception data from a radar and/or lidar perception layer 222, camera perception layer 224, other perception layer, etc., and/or data from one or more sensors themselves to analyze conditions in the vehicle sensor data. The sensor fusion and RWM management layer 236 may be configured to detect conditions in the sensor data, such as sensor measurements being at, above, or below a threshold, certain types of sensor measurements occurring, etc., and may output the sensor data as part of the refined location and state information of the vehicle 102 provided to the behavior planning and prediction layer 240 and/or devices remote from the vehicle 100, such as a data server, other vehicles, etc., via wireless communications, such as through C-V2X connections, other wireless connections, etc.

The behavioral planning and prediction layer 240 of the autonomous vehicle processing system 220 may use the refined location and state information of the vehicle 102 and location and state information of other vehicles and objects output from the sensor fusion and RWM management layer 236 to predict future behaviors of other vehicles and/or objects. For example, the behavioral planning and prediction layer 240 may use such information to predict future relative positions of other vehicles in the vicinity of the vehicle based on own vehicle position and velocity and other vehicle positions and velocity. Such predictions may take into account information from the map data and route planning to anticipate changes in relative vehicle positions as host and other vehicles follow the roadway. The behavioral planning and prediction layer 240 may output other vehicle and object behavior and location predictions to the motion planning and control layer 238.

Additionally, the behavior planning and prediction layer 240 may use object behavior in combination with location predictions to plan and generate control signals for controlling the motion of the vehicle 102. For example, based on route planning information, refined location in the roadway information, and relative locations and motions of other vehicles, the behavior planning and prediction layer 240 may determine that the vehicle 102 needs to change lanes and accelerate, such as to maintain or achieve minimum spacing from other vehicles, and/or prepare for a turn or exit. As a result, the behavior planning and prediction layer 240 may calculate or otherwise determine a steering angle for the wheels and a change to the throttle setting to be commanded to the motion planning and control layer 238 and ADS vehicle control unit 242 along with such various parameters necessary to effectuate such a lane change and acceleration. One such parameter may be a computed steering wheel command angle.

The motion planning and control layer 238 may receive data and information outputs from the sensor fusion and RWM management layer 236, map data from the map database 232, and other vehicle and object behavior as well as location predictions from the behavior planning and prediction layer 240, and use this information to plan and generate control signals for controlling the motion of the vehicle 102 and to verify that such control signals meet safety requirements for the vehicle 100. For example, based on route planning information, refined location in the roadway information, and relative locations and motions of other vehicles, the motion planning and control layer 238 may verify and pass various control commands or instructions to the ADS vehicle control unit 242.

The ADS vehicle control unit 242 may receive the commands or instructions from the motion planning and control layer 238 and translate such information into mechanical control signals for controlling wheel angle, brake and throttle of the vehicle 100. For example, ADS vehicle control unit 242 may respond to the computed steering wheel command angle by sending corresponding control signals to the steering wheel controller.

In various embodiments, the vehicle processing system 104 may communicate with other vehicle processing system participants (e.g., other vehicles, roadside units, etc.) via wireless communication links to transmit sensor data, position data, vehicle data and data gathered about the environment around the vehicle by onboard sensors. Such information may be used by other vehicle processing system participants to update stored sensor data for relay to other vehicle processing system participants.

In various embodiments, the vehicle processing system 220 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 240 (or in a separate layer) may determine the current or future separate distance between another vehicle (as defined by the sensor fusion and RWM management layer 236) and the vehicle (e.g., based on the world model refined by the sensor fusion and RWM management layer 236), compare that separation distance to a safe separation distance parameter stored in memory, and issue instructions to the motion planning and control layer 238 to speed up, slow down or turn if the current or predicted separation distance violates the safe separation distance parameter. As another example, safety or oversight functionality in the motion planning and control layer 238 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 3:
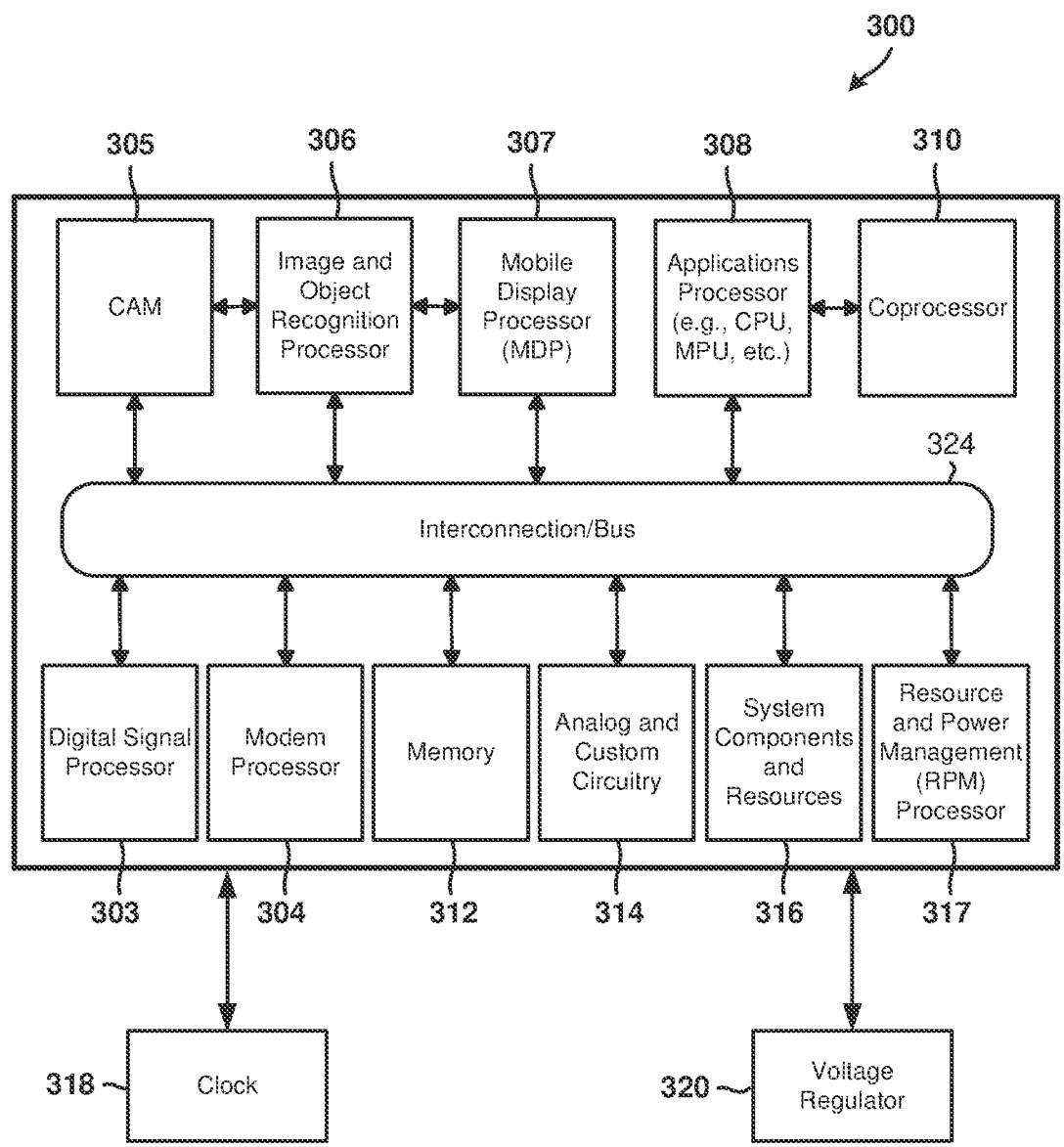
FIG. 3 is a block diagram illustrating components of a system on chip suitable for use in a vehicle processing system in accordance with various embodiments.

FIG. 3 is a block diagram illustrating an example components of a system on chip (SOC) 300 suitable for use in a vehicle processing system in accordance with various embodiments. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317.

Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles, and otherwise perform functions of the camera perception layer 224 as described. In some embodiments, the processor 306 may be configured to process radar or lidar data and perform functions of the radar and/or lidar perception layer 222 as described.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communications with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4A:
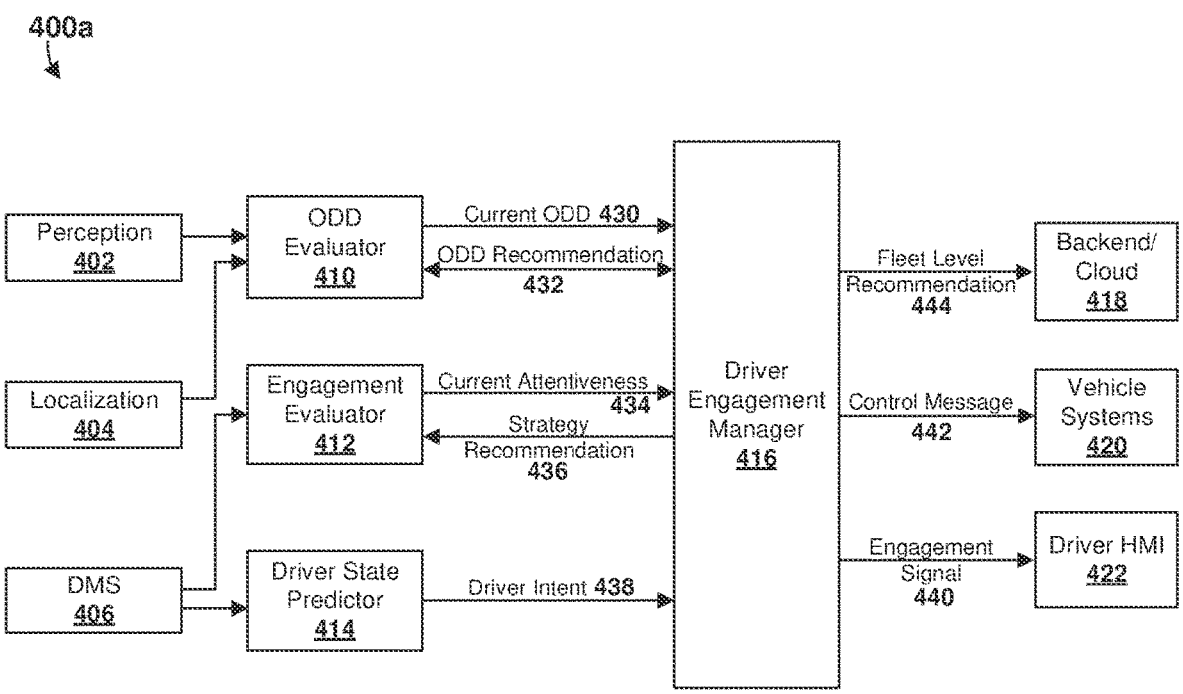
FIG. 4A is a block diagram illustrating elements of a vehicle processing system suitable for implementing various embodiments.

FIG. 4A is a block diagram illustrating elements of a vehicle processing system 400a suitable for implementing various embodiments. With reference to FIGS. 1A-4A, the vehicle processing system 400a may include a perception module 402, a localization module 404, and a driver monitoring system (DMS) module 406. Such modules 402, 404, 406 may be implemented in software processing modules that execute in a vehicle computing device, within dedicated hardware modules within the vehicle, or in combinations of software processing modules and dedicated hardware modules that make up the vehicle processing system 400a.

The perception module 402 may receive information about the vehicle's environment from one or more vehicle sensors (e.g., 214), such as via a camera perception module 224 and/or a radar and/or LIDAR perception module 222 as described. The localization module 404 may receive information about the physical location of the vehicle, including information from memory such as a high definition map or other suitable data structure), such as via a positioning engine 226, a map database 228 and/or a map fusion and arbitration module 230 as described. The DMS module 406 may receive information about the driver (and possibly about passengers as well) from a variety of sensors within the vehicle, such as driver-facing cameras and physiological sensors implemented on the steering wheel, driver seat, etc.

The vehicle processing system 400a also may include an operational design domain (ODD) evaluator module 410, an engagement evaluator module 412, and a driver state predictor module 414. The ODD evaluator module 410 may receive information from the perception module 402 and the localization module 404. The ODD evaluator module 410 may be configured to determine information about a current ODD proximate to the vehicle, such as current road conditions, a complexity of the roadway proximate to the vehicle, a complexity of traffic conditions or traffic patterns, and/or other aspects of the current ODD proximate to the vehicle. The engagement evaluator module 412 and the driver state predictor module 414 may each receive information from the DMS module 406. The engagement evaluator module 412 may be configured to determine information about a current state of driving attentiveness of the vehicle's driver.

The driver state predictor 414 may be configured to determine information about drivers intended behavior and or near future behavior. In some embodiments, the driver state predictor 414 may be configured to determine whether the roadway proximate to the vehicle produces, or will produce, a negative emotional expression by the driver.

The ODD evaluator module 410, the engagement evaluator module 412, and the driver state predictor module 414 each may communicate with a driver engagement manager 416. The driver engagement manager 416 may be configured to receive information about the current ODD 430 from the ODD evaluator module 410, information about the current state or level of driver attentiveness 434 from the engagement evaluator 412, and information about a driver's intent 438 from the driver state predictor module 414. Based on the information about the current ODD 430, the information about the current state or level of driver attentiveness 434, and the information about a driver's intent 438, in some embodiments the driver engagement manager 416 may identify appropriate nominal or typical behavior of the driver by observing the driver's behavior during manual driving (e.g., when the driver is performing driving operations). In this manner, the driver engagement manager 416 may learn the driver's normal or typical driving behavior over time.

In various embodiments, using the information about the current ODD 430, the information about the current state or level of driver attentiveness 434, and the information about a driver's intent 438, the driver engagement manager 416 may be configured to evaluate a driving risk on a roadway proximate to the vehicle using historical data associated with the roadway, identify an emotive expression of the driver using vehicle sensor data. The driver engagement manager 416 also may be configured to obtain historical data regarding driver reaction times for assuming full control of other vehicles. In some embodiments, the engagement manager 416 may also obtain historical data regarding whether drivers assuming full control the other vehicles avoided an accident on the roadway proximate to the vehicle under similar conditions and circumstances. For example, the processor may access a database in which is stored information characterizing how drivers of other vehicles (e.g., drivers of a fleet of vehicles or obtained via crowd-sourcing methods) assumed full control of their vehicles under comparable roadway conditions and circumstances, including how quickly drivers were able to assume control (e.g., an average reaction time) and whether drivers were able to avoid an accident by doing so under those circumstances and/or roadway conditions.

The driver engagement manager 416 may select a minimum level of driver engagement suitable for the roadway proximate to the vehicle based on the evaluated driving risk, the identified emotive expression of the driver, and whether historical driver fallback behavior (i.e., assuming full control of the vehicle) avoided an accident on the roadway proximate to the vehicle. The driver engagement manager 416 may observe a driver behavior using one or more vehicle sensors, and may take an action in response to determining that the driver behavior does not meet the minimum level of driver engagement suitable for the roadway proximate to the vehicle.

In some embodiments, the driver engagement manager 416 may generate an ODD recommendation 432, which the driver engagement manager 416 may use internally and/or may provide to the ODD evaluator 410. In some embodiments, the ODD recommendation 432 may include a determination to enable one or more features, aspects, or operations of the driver engagement manager 416, such as based on a current driver engagement level.

In some embodiments, the driver engagement manager 416 may provide a strategy recommendation 436 to the engagement evaluator 412. In some embodiments, the strategy recommendation 436 may include one or more aspects of a minimum level of driver engagement. For example, the strategy recommendation 436 may include a permitted duration that one or more of the driver's hands can be off the steering wheel, a permitted duration that a driver can avert eyes from the road, whether one hand is required to be touching the steering wheel at all times, and/or other suitable requirements. In some embodiments, the engagement evaluator 412 may modify or update the current attentiveness 434 based on one or more aspects or requirements in the strategy recommendation 436.

In some embodiments, the driver engagement manager 416 may take an action in response to determining that the driver behavior does not meet the minimum level of driver engagement suitable for the roadway proximate to the vehicle. For example, the driver engagement manager 416 may provide an engagement signal 440 to a driver human-machine interface (HMI) 422. In some embodiments, the engagement signal 440 may cause the driver HMI 422 to perform an action encouraging driver engagement or increasing driver attention on the driving context. For example, the engagement signal 440 may cause or instruct the driver HMI 422 to display a message, emit a sound, provide haptic feedback to the steering wheel or another suitable control surface of the vehicle, and/or perform another operation to encourage driver engagement or increase driver attention on the driving context.

In some embodiments, the driver engagement manager 416 may provide a control message 442 to one or more vehicle systems 420 in response to determining that the driver behavior does not meet the minimum level of driver engagement suitable for the roadway proximate to the vehicle. For example, the control message 442 may disable or restrict driver (or passenger) access to one or more functions of the vehicle in response to determining that the driver's behavior does not meet the minimum level of driver engagement. For example, the control message 442 may disable or restrict use of an infotainment system (or portions thereof, such as disable video content, but retain audio content), a navigation system, or another system or function that uses a display device of the vehicle or that may take a portion of the driver's attention. As another example, the control message 442 may disable or restrict use of an external communication system (e.g., cellular phone communication). As another example, the control message 442 may disable or restrict use of a radio or music system. Other actions taken in response to the control message 442 are also possible.

In some embodiments, the driver engagement manager 416 may provide a fleet level recommendation 444 to a network computing device, such as a backend computing system or a cloud computing system 418. In some embodiments, the fleet level recommendation 444 may include a minimum level of driver engagement suitable for the roadway proximate to the vehicle. In some embodiments, the fleet level recommendation 444 may be configured to enable other vehicles to apply the minimum level of driver engagement suitable for the roadway when other vehicles traverse that area.

Figure 4B:
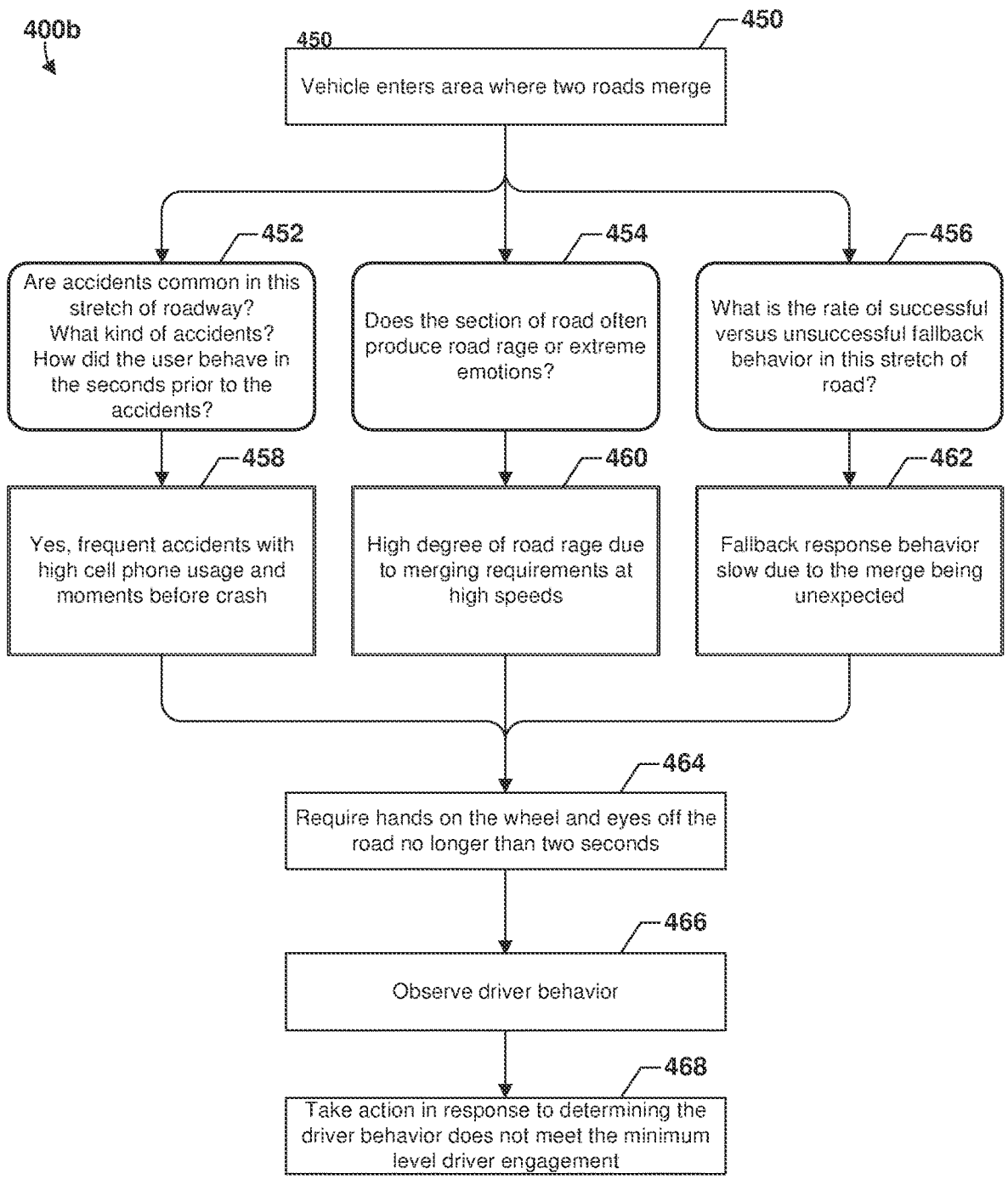
FIGS. 4B and 4C are process flow diagrams of example methods performed by processing system of vehicle for managing driver engagement in accordance with various embodiments.
Figure 4C:
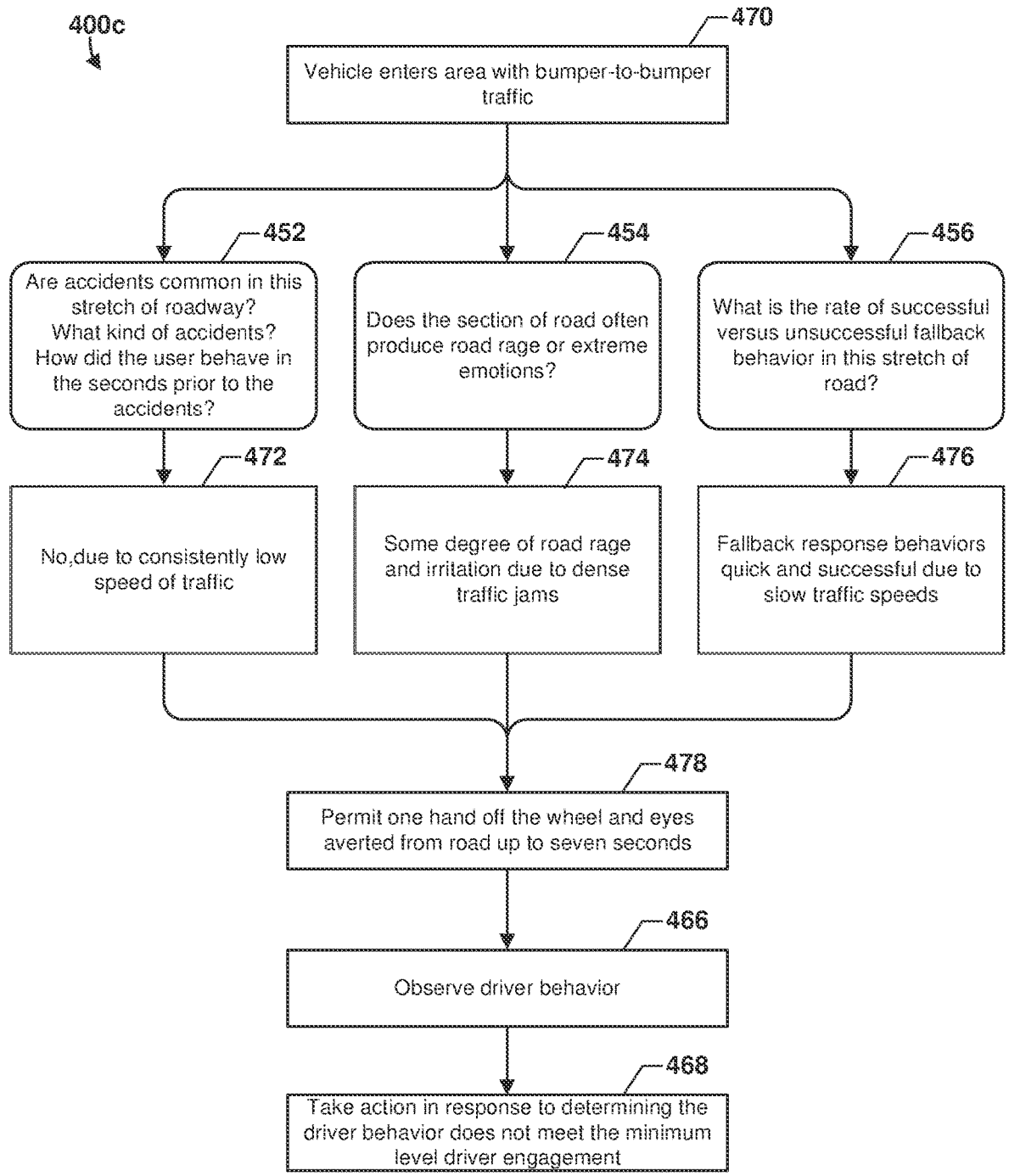

FIGS. 4B and 4C are process flow diagrams illustrating example methods 400b and 400c that may be performed by processing system of vehicle for managing driver engagement under specific road and traffic conditions in accordance with various embodiments. FIGS. 4B and 4C are intended to illustrate how a processor executing the method 400a would process through example determinations under the identified road and traffic conditions and arrive at a resulting actions. These examples are for illustration purposes and are not intended to be limiting because the method 400a is generally applicable to any roadway and traffic conditions, and under different such conditions (e.g., intersections, traffic lights, presence of emergency vehicle, scene of an accident, presence of pedestrian/bicyclist, presence of animal (e.g., deer by road), debris/roadkill in road, inclement weather, construction zone, presence of an erratic driver, etc.), different assessments may be made and different actions may be taken in response.

In the example 400b illustrated in FIG. 4B, the processor identifies a road condition or traffic condition in block 450 in which the vehicle has entered an area where two roads merge. In response to determining that the vehicle has entered an area in which two roads merge, the processor may perform operations to evaluate a driving risk on a roadway proximate to the vehicle using historical data associated with the roadway, identify an emotive expression of the driver using vehicle sensor data, and obtain historical data about driver fallback behavior including driver reaction times for assuming full control of other vehicles. In some embodiments, the processor may also obtain historical data regarding whether drivers assuming full control of the other vehicles avoided an accident on the roadway proximate to the vehicle under comparable conditions and/or circumstances.

In this example, the processor performs operations in block 452 to obtain information (e.g., from a database) regarding whether accidents are common in the road area (e.g., a frequency or quantity of accidents), what kind or types of accidents have occurred, and a user behavior just prior to the accident(s). In this example, processor obtains information in block 458 that accidents frequently occur in this area of roadway. In some embodiments, the information obtained in block 458 may include a user behavior just prior to an accident, such as a high correlation of or many instances of cell phone usage by drivers whose vehicles are involved in an accident.

In this example, the processor performs operations in block 454 to obtain information (e.g., from a database) regarding whether the area of road produces driver emotions such as road rage, frustration, irritation, or another emotional state or emotional expression, particularly one that may lead to or cause driver distraction. In this example, the processor obtains information in block 460 that drivers typically (often, to a high degree) express anger or road rage in this area of roadway. In some embodiments, the information obtained in block 460 may include an environmental correlation, such as that the merge occurs at relatively high vehicle speeds.

In this example, the processor performs operations in block 456 to obtain information (e.g., from a database) regarding a rate of successful or unsuccessful driver fallback behavior, in which the driver assumes greater or total manual control of vehicle driving operations. In this example, the information obtained in block 456 indicates that that driver fallback response behaviors are slowed due to the merge being unexpected (for example, there are few or no signs signaling the merge, a driver view of the merge area is obstructed or unclear, and/or the like).

In this example, based on the evaluated driving risk, the identified emotive expression of the driver, and whether historical driver fallback behavior avoided an accident on the roadway proximate to the vehicle (e.g., the determinations in blocks 458, 460, and 462), the processor may select a minimum level of driver engagement suitable for the roadway proximate to the vehicle in block 464. In this example, the minimum level of driver engagement in block 464 may require that the driver's hands remain on the steering wheel, and that the driver may not avert his or her eyes from the road for longer than a period of time (e.g., two seconds). Other examples of required driver behavior are also possible.

In some embodiments, the processor may observe driver behavior in block 466, for example, using one or more vehicle sensors. In response to determining that the driver behavior does not meet the minimum level of driver engagement suitable for the roadway proximate to the vehicle, the processor may take an action in block 468. In some embodiments, the action may be configured or designed to encourage driver behavior that meets the minimum level of driver engagement, or to mitigate a potential distraction that may prevent driver engagement from meeting the minimum level.

In the example 400c illustrated in FIG. 4C, the processor identifies a roadway condition or traffic condition in block 470 in which the vehicle has entered an area with bumper-to-bumper traffic. In response to determining that the vehicle has entered an area with bumper-to-bumper traffic, the processor may perform operations to evaluate a driving risk on a roadway proximate to the vehicle using historical data associated with the roadway, identify an emotive expression of the driver using vehicle sensor data, and obtain historical data about driver fallback behavior including driver reaction times for assuming full control of other vehicles. In some embodiments, the processor may also obtain historical information regarding whether drivers assuming full control of the other vehicles avoided an accident on the roadway proximate to the vehicle under comparable conditions and/or circumstances. For example, the processor may perform operations in blocks 452, 454, and/or 456 to obtain historical information regarding accident rates, driver emotions and driver fallback behaviors as described for like numbered blocks with reference to FIG. 4B.

In the example illustrated in FIG. 4C, the information obtained in block 452 indicates that accidents do not frequently occur in this area of roadway. In some embodiments, the determination in block 472 may include a correlation to a roadway condition, such a correlation of typically low traffic speeds due to the traffic congestion.

In this example, the processor obtains information in block 474 that drivers typically (often, to a high degree) express a relatively small or low degree of frustration or road rage in this area of roadway. In some embodiments, the determination in block 460 may include an environmental correlation, such as that the frustration or road rage correlates with the traffic congestion.

In this example, the processor obtains information in block 476 that driver fallback response behaviors are typically quick and successful because congested or bumper-to-bumper traffic typically involves relatively slow traffic speeds.

In this example, based on the evaluated driving risk, the identified emotive expression of the driver, and whether historical driver fallback behavior avoided an accident on the roadway proximate to the vehicle (e.g., the determinations in blocks 458, 460, and 462), the processor may select a minimum level of driver engagement in block 478 suitable for the roadway proximate to the vehicle. For example, the minimum level of driver engagement in block 478 may permit one of the driver's hands to leave the wheel, and permit the driver to avert his or her eyes from the road for a period of time (e.g., up to seven seconds). Other examples of required driver behavior are also possible.

In some embodiments, the processor may observe driver behavior in block 466, for example, using one or more vehicle sensors, as described. In response to determining that the driver behavior does not meet the minimum level of driver engagement suitable for the roadway proximate to the vehicle, the processor may take an action in block 468, as described.

It will be appreciated that the roadway conditions, associated driving risks, emotive expressions of the driver, and historical data about driver reaction times for assuming full control of the vehicle are each highly variable and dynamic. Thus, the operations 400b and 400c are provided as examples of possible operations involving certain roadway conditions, driving risks, driver emotive expressions, and historical data about driver reaction times, but are not intended as limitations of roadway conditions, driving risks, driver emotions, or historical data in which or with which the operations of various embodiments may be performed.

Figure 5:
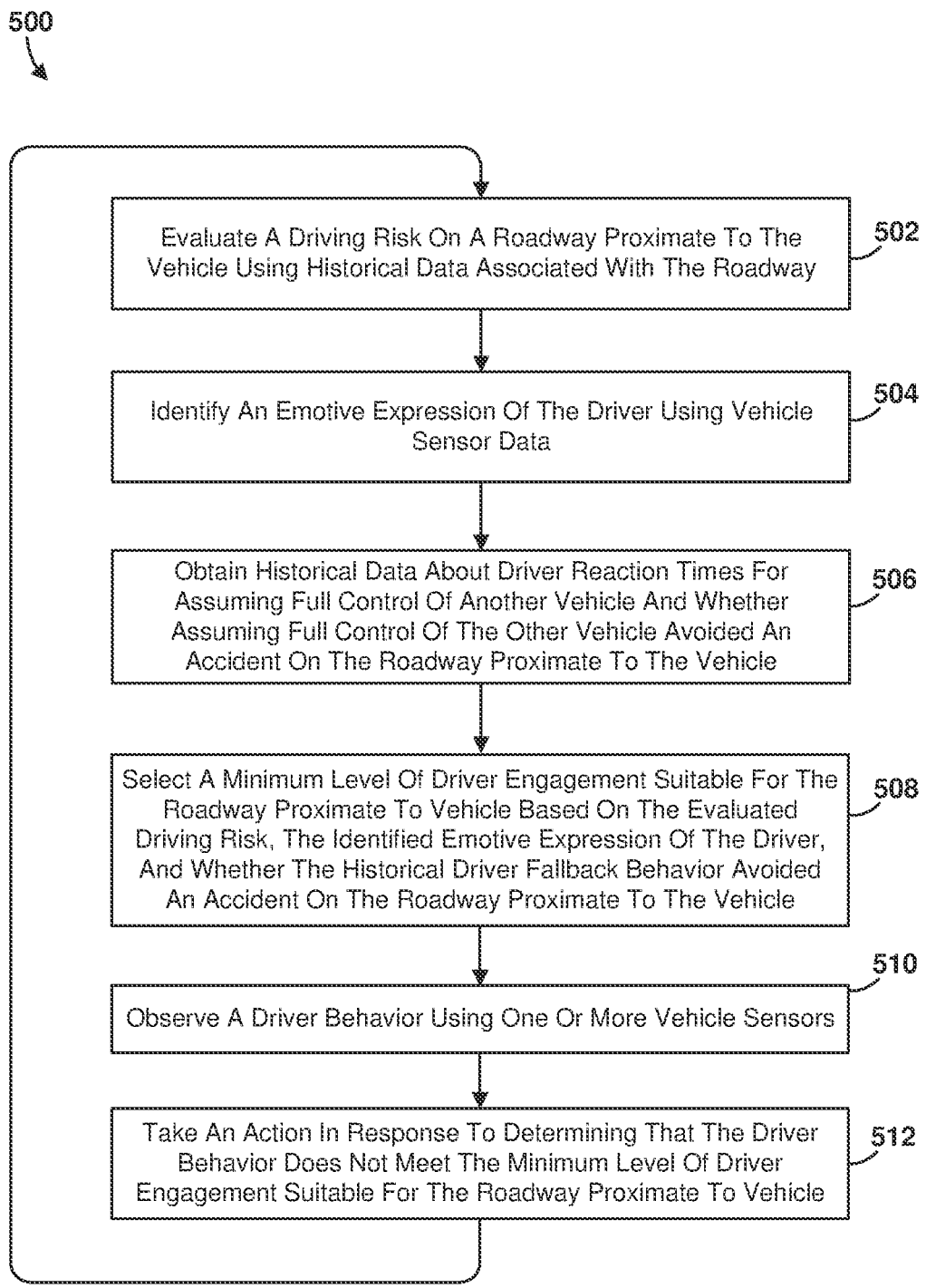
FIG. 5 is a process flow diagram of an example method performed by a processor of a vehicle processing system in a vehicle for managing driver engagement in accordance with various embodiments.

FIG. 5 is a process flow diagram of an example method 500 performed by a processor of a vehicle processing system in a vehicle for managing driver engagement in accordance with various embodiments. With reference to FIGS. 1A-5, means for performing operations of the method 500 include (e.g., 207, 303, 304, 306, 307, 308, 310) of a vehicle processing system (e.g., 104, 200, 220, 300, 400a) that may be implemented in hardware elements, software elements, or a combination of hardware and software elements, referred to generally as a "processor."

In block 502, the processor may evaluate a driving risk on a roadway proximate to the vehicle using historical data associated with the roadway (e.g., operations 452). In some embodiments, the processor may determine a risk metric based on one or more of a metric of a frequency of one or more accidents that occurred in the roadway proximate to the vehicle, a severity metric of the one or more accidents, and a driver behavior metric of driver behavior prior to each of the one or more accidents. In some embodiments, the processor also may use sensor data received from one or more vehicle sensors and/or sensor data from other connected devices (e.g., smart phone, watch, smart glasses, etc.) in evaluating the driving risk on the roadway proximate to the vehicle.

In block 504, the processor may identify an emotive expression of the driver using vehicle sensor data. In some embodiments, the processor may identify the emotive expression of the driver based on one or more of a driver facial expression, a driver utterance, a driver hand gesture, a driver stress level, biometrics (e.g., heart rate from a connected smart watch or other sensor for measuring such), etc. Examples of aspects regarding driver utterances that the processor may identify and evaluate include particular words (e.g., expletives), volume, pitch, and duration or frequency of utterances, any of which may be correlated to various driver emotional states (e.g., anger, fear, anxiety, confusion, etc.).

In block 506, the processor may obtain historical data about driver fallback behavior including driver reaction times for assuming full control of other vehicles. In some embodiments, as part of the operations in block 506, the processor may also obtain historical data regarding whether drivers assuming full control of the other vehicles avoided an accident on the roadway proximate to the vehicle under comparable conditions and/or circumstances. For example, the processor may access a database in which is stored information characterizing how drivers of other vehicles (e.g., drivers of a fleet of vehicles or obtained via crowd-sourcing methods) assumed full control of their vehicles under comparable circumstances, including how quickly drivers were able to assume control (e.g., an average reaction time) and whether drivers were able to avoid an accident by doing so under those circumstances and/or roadway conditions.

In block 508, the processor may select a minimum level of driver engagement suitable for the roadway proximate to the vehicle based on the evaluated driving risk, the identified emotive expression of the driver, and whether historical driver fallback behavior avoided an accident on the roadway proximate to the vehicle. In some embodiments, the minimum level of driver engagement may include a duration of time that the driver is permitted to remove a hand from a steering wheel of the vehicle. In some embodiments, the minimum level of driver engagement may include a duration of time that the driver is permitted to avert eyes from the roadway.

In block 510, the processor may observe a driver behavior using one or more vehicle sensors.

In block 512, the processor may take some an action in response to determining that the driver behavior does not meet the minimum level of driver engagement suitable for the roadway proximate to the vehicle. For example, the processor may disable driver access to one or more functions of the vehicle in response to determining that the driver behavior does not meet the minimum level of driver engagement.

Implementation examples are described in the following paragraphs. While some of the following implementation examples are described in terms of example methods, further example implementations may include: the example methods discussed in the following paragraphs implemented by a vehicle processing system that may be an on-board unit, mobile device unit, or mobile computing unit, or a processing system of a network computing device, including a processor configured with processor-executable instructions to perform operations of the methods of the following implementation examples; the example methods discussed in the following paragraphs implemented by a vehicle processing system or a processing system of a network computing device including means for performing functions of the methods of the following implementation examples; and the example methods discussed in the following paragraphs may be implemented as a non-transitory processor-readable storage medium having stored thereon processor-executable instructions configured to cause a processor of a vehicle processing system or a network computing device processing system to perform the operations of the methods of the following implementation examples.

Example 1. A method performed by a processing system of a vehicle for managing driver engagement, including evaluating a driving risk on a roadway proximate to the vehicle using historical data associated with the roadway, identifying an emotive expression of the driver using vehicle sensor data, obtaining historical data about driver reaction times for assuming full control of other vehicles and whether assuming full control of the other vehicles avoided an accident on the roadway proximate to the vehicle, selecting a minimum level of driver engagement suitable for the roadway proximate to the vehicle based on the evaluated driving risk, the identified emotive expression of the driver, and whether historical driver fallback behavior avoided an accident on the roadway proximate to the vehicle, observing a driver behavior using one or more vehicle sensors, and taking an action in response to determining that the driver behavior does not meet the minimum level of driver engagement suitable for the roadway proximate to the vehicle.

Example 2. The method of example 1, further including obtaining historical data regarding whether assuming full control of the other vehicles avoided an accident on the roadway proximate to the vehicle, in which selecting the minimum level of driver engagement suitable for the roadway proximate to the vehicle is further based on historical data regarding whether assuming full control of the other vehicles avoided an accident on the roadway proximate to the vehicle.

Example 3. The method of either of examples 1 or 2, in which the evaluating the driving risk on the roadway proximate to the vehicle using historical data associated with the roadway includes determining a risk metric based on one or more of a metric of a frequency of one or more accidents that occurred in the roadway proximate to the vehicle, a severity metric of the one or more accidents, and a driver behavior metric of driver behavior prior to each of the one or more accidents.

Example 4. The method of any of examples 1-3, in which the evaluating the driving risk on the roadway proximate to the vehicle using historical data associated with the roadway is further based on sensor data received from one or more vehicle sensors.

Example 5. The method of any of examples 1-4, in which identifying the emotive expression of the driver using vehicle sensor data is based on one or more of a driver facial expression, a driver utterance, a driver hand gesture, or a driver stress level.

Example 6. The method of any of examples 1-5, in which the minimum level of driver engagement suitable for the roadway proximate to the vehicle includes a duration of time that the driver is permitted to remove a hand from a steering wheel of the vehicle.

Example 7. The method of any of examples 1-6, in which the minimum level of driver engagement suitable for the roadway proximate to the vehicle includes a duration of time that the driver is permitted to avert eyes from the roadway.

Example 8. The method of any of examples 1-7, in which taking the action in response to determining that the driver behavior does not meet the minimum level of driver engagement suitable for the roadway proximate to the vehicle includes disabling driver access to one or more functions of the vehicle in response to determining that the driver behavior does not meet the minimum level of driver engagement.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processing system of a vehicle for managing driver engagement, comprising:
    evaluating a driving risk on a roadway proximate to the vehicle using historical data associated with the roadway, wherein the driving risk includes a severity metric associated with a severity of prior accidents on the roadway;
    identifying an emotive expression of the driver using vehicle sensor data;
    obtaining historical data about driver reaction times for assuming full control of other vehicles;
    selecting a minimum level of driver engagement suitable for the roadway proximate to the vehicle based on the evaluated driving risk including the severity metric, the identified emotive expression of the driver, and the historical data about driver reaction times;
    observing a driver behavior using one or more vehicle sensors; and
    taking an action in response to determining that the driver behavior does not meet the minimum level of driver engagement suitable for the roadway proximate to the vehicle.

2. The method of claim 1, further comprising obtaining historical data regarding whether assuming full control of the other vehicles avoided an accident on the roadway proximate to the vehicle, wherein selecting the minimum level of driver engagement suitable for the roadway proximate to the vehicle is further based on the historical data regarding whether assuming full control of the other vehicles avoided the accident on the roadway proximate to the vehicle.

3. The method of claim 1, wherein the evaluating the driving risk on the roadway proximate to the vehicle using historical data associated with the roadway comprises determining a risk metric based on one or more of a metric of a frequency of one or more accidents that occurred in the roadway proximate to the vehicle, the severity metric of the one or more accidents, and a driver behavior metric of driver behavior prior to each of the one or more accidents.

4. The method of claim 1, wherein the evaluating the driving risk on the roadway proximate to the vehicle using historical data associated with the roadway is further based on sensor data received from the one or more vehicle sensors.

5. The method of claim 1, wherein identifying the emotive expression of the driver using the vehicle sensor data is based on one or more of a driver facial expression, a driver utterance, a driver hand gesture, or a driver stress level.

6. The method of claim 1, wherein the minimum level of driver engagement suitable for the roadway proximate to the vehicle comprises a duration of time that the driver is permitted to remove a hand from a steering wheel of the vehicle.

7. The method of claim 1, wherein the minimum level of driver engagement suitable for the roadway proximate to the vehicle comprises a duration of time that the driver is permitted to avert eyes from the roadway.

8. The method of claim 1, wherein taking the action in response to determining that the driver behavior does not meet the minimum level of driver engagement suitable for the roadway proximate to the vehicle comprises disabling driver access to one or more functions of the vehicle in response to determining that the driver behavior does not meet the minimum level of driver engagement.

9. A processing system for use in a vehicle, comprising:
    a processor configured with processor-executable instructions to:
        evaluate a driving risk on a roadway proximate to the vehicle using historical data associated with the roadway, wherein the driving risk includes a severity metric associated with a severity of prior accidents on the roadway;
        identify an emotive expression of a driver using vehicle sensor data;
        obtain historical data about driver reaction times for assuming full control of other vehicles;
        select a minimum level of driver engagement suitable for the roadway proximate to the vehicle based on the evaluated driving risk including the severity metric, the identified emotive expression of the driver, and the historical data about driver reaction times;
        observe a driver behavior using one or more vehicle sensors; and
        take an action in response to determining that the driver behavior does not meet the minimum level of driver engagement suitable for the roadway proximate to the vehicle.

10. The processing system of claim 9, wherein the processor is further configured to: obtain historical data regarding whether assuming full control of the other vehicles avoided an accident on the roadway proximate to the vehicle; and select the minimum level of driver engagement suitable for the roadway proximate to the vehicle further based on the historical data regarding whether assuming full control of the other vehicles avoided the accident on the roadway proximate to the vehicle.

11. The processing system of claim 9, wherein the processor is further configured to determine a risk metric based on one or more of a metric of a frequency of one or more accidents that occurred in the roadway proximate to the vehicle, the severity metric of the one or more accidents, and a driver behavior metric of driver behavior prior to each of the one or more accidents.

12. The processing system of claim 9, wherein the processor is further configured to evaluate the driving risk on the roadway proximate to the vehicle using historical data associated with the roadway based on sensor data received from the one or more vehicle sensors.

13. The processing system of claim 9, wherein the processor is further configured to identify the emotive expression of the driver using the vehicle sensor data based on one or more of a driver facial expression, a driver utterance, a driver hand gesture, or a driver stress level.

14. The processing system of claim 9, wherein the processor is further configured such that the minimum level of driver engagement suitable for the roadway proximate to the vehicle comprises a duration of time that the driver is permitted to remove a hand from a steering wheel of the vehicle.

15. The processing system of claim 9, wherein the processor is further configured such that the minimum level of driver engagement suitable for the roadway proximate to the vehicle comprises a duration of time that the driver is permitted to avert eyes from the roadway.

16. The processing system of claim 9, wherein the processor is further configured to disable driver access to one or more functions of the vehicle in response to determining that the driver behavior does not meet the minimum level of driver engagement.

17. A processing system for use in a vehicle, comprising:
means for evaluating a driving risk on a roadway proximate to the vehicle using historical data associated with the roadway, wherein the driving risk includes a severity metric associated with a severity of prior accidents on the roadway;
means for identifying an emotive expression of a driver using vehicle sensor data;
means for obtaining historical data about driver reaction times for assuming full control of other vehicles;
means for selecting a minimum level of driver engagement suitable for the roadway proximate to the vehicle based on the evaluated driving risk including the severity metric, the identified emotive expression of the driver, and the historical data about driver reaction times;
means for observing a driver behavior using one or more vehicle sensors; and
means for taking an action in response to determining that the driver behavior does not meet the minimum level of driver engagement suitable for the roadway proximate to the vehicle.

18. The processing system of claim 17, further comprising means for obtaining historical data regarding whether assuming full control of the other vehicles avoided an accident on the roadway proximate to the vehicle, wherein means for selecting the minimum level of driver engagement suitable for the roadway proximate to the vehicle comprises means for selecting the minimum level of driver engagement suitable for the roadway proximate to the vehicle further based on the historical data regarding whether assuming full control of the other vehicles avoided the accident on the roadway proximate to the vehicle.

19. The processing system of claim 17, wherein the means for evaluating the driving risk on the roadway proximate to the vehicle using historical data associated with the roadway comprises means for determining a risk metric based on one or more of a metric of a frequency of one or more accidents that occurred in the roadway proximate to the vehicle, the severity metric of the one or more accidents, and a driver behavior metric of driver behavior prior to each of the one or more accidents.

20. The processing system of claim 17, wherein means for evaluating the driving risk on the roadway proximate to the vehicle using historical data associated with the roadway uses sensor data received from the one or more vehicle sensors.

21. The processing system of claim 17, wherein means for identifying the emotive expression of the driver using the vehicle sensor data uses one or more of a driver facial expression, a driver utterance, a driver hand gesture, or a driver stress level.

22. The processing system of claim 17, wherein the minimum level of driver engagement suitable for the roadway proximate to the vehicle comprises a duration of time that the driver is permitted to remove a hand from a steering wheel of the vehicle.

23. The processing system of claim 17, wherein the minimum level of driver engagement suitable for the roadway proximate to the vehicle comprises a duration of time that the driver is permitted to avert eyes from the roadway.

24. The processing system of claim 17, wherein means for taking the action in response to determining that the driver behavior does not meet the minimum level of driver engagement suitable for the roadway proximate to the vehicle comprises means for disabling driver access to one or more functions of the vehicle in response to determining that the driver behavior does not meet the minimum level of driver engagement.

25. A non-transitory processor-readable medium having stored thereon processor-executable instructions configured to cause a processing device of a vehicle to perform operations comprising:
evaluating a driving risk on a roadway proximate to the vehicle using historical data associated with the roadway, wherein the driving risk includes a severity metric associated with a severity of prior accidents on the roadway;
identifying an emotive expression of a driver using vehicle sensor data;
obtaining historical data about driver reaction times for assuming full control of other vehicles;
selecting a minimum level of driver engagement suitable for the roadway proximate to the vehicle based on the evaluated driving risk including the severity metric, the identified emotive expression of the driver, and the historical data about driver reaction times;
observing a driver behavior using one or more vehicle sensors; and
taking an action in response to determining that the driver behavior does not meet the minimum level of driver engagement suitable for the roadway proximate to the vehicle.

26. The non-transitory processor-readable medium of claim 25, wherein the stored processor-executable instructions are further configured to cause the processing device to perform operations comprising: obtaining historical data regarding whether assuming full control of the other vehicles avoided an accident on the roadway proximate to the vehicle; and selecting the minimum level of driver engagement suitable for the roadway proximate to the vehicle further based on the historical data regarding whether assuming full control of the other vehicles avoided the accident on the roadway proximate to the vehicle.

27. The non-transitory processor-readable medium of claim 25, wherein the stored processor-executable instructions are further configured to cause the processing device to perform operations such that the evaluating the driving risk on the roadway proximate to the vehicle using historical data associated with the roadway comprises determining a risk metric based on one or more of a metric of a frequency of one or more accidents that occurred in the roadway proximate to the vehicle, the severity metric of the one or more accidents, and a driver behavior metric of driver behavior prior to each of the one or more accidents.

28. The non-transitory processor-readable medium of claim 25, wherein the stored processor-executable instructions are further configured to cause the processing device to perform operations such that the evaluating the driving risk on the roadway proximate to the vehicle using historical data associated with the roadway is further based on sensor data received from the one or more vehicle sensors.

29. The non-transitory processor-readable medium of claim 25, wherein the stored processor-executable instructions are further configured to cause the processing device to perform operations such that identifying the emotive expression of the driver using the vehicle sensor data is based on one or more of a driver facial expression, a driver utterance, a driver hand gesture, or a driver stress level.

30. The non-transitory processor-readable medium of claim 25, wherein the stored processor-executable instructions are further configured to cause the processing device to perform operations such that the minimum level of driver engagement suitable for the roadway proximate to the vehicle comprises at least one of a duration of time that the driver is permitted to remove a hand from a steering wheel of the vehicle or a duration of time that the driver is permitted to avert eyes from the roadway.

\* \* \* \* \*